(12) United States Patent
Aharoni

(10) Patent No.: US 8,446,340 B2
(45) Date of Patent: May 21, 2013

(54) DEVICE AND METHOD FOR ALIGNMENT OF BINOCULAR PERSONAL DISPLAY

(75) Inventor: Abraham Aharoni, Rehovot (IL)

(73) Assignee: Lumus Ltd. (IL)

( * ) Notice: Subject to any disclaimer, the term of this patent is extended or adjusted under 35 U.S.C. 154(b) by 977 days.

(21) Appl. No.: 12/281,905

(22) PCT Filed: Mar. 6, 2007

(86) PCT No.: PCT/IL2007/000279
§ 371 (c)(1),
(2), (4) Date: Sep. 5, 2008

(87) PCT Pub. No.: WO2007/102144
PCT Pub. Date: Sep. 13, 2007

(65) Prior Publication Data
US 2009/0153437 A1    Jun. 18, 2009

(30) Foreign Application Priority Data
Mar. 8, 2006   (IL) .......................................... 174170

(51) Int. Cl.
*G09G 5/00*   (2006.01)
(52) U.S. Cl.
USPC ............ 345/7; 345/8; 348/51; 349/15; 353/7; 359/376

(58) Field of Classification Search
USPC ......... 345/7–8; 348/51–60; 349/15; 353/7–9; 359/376–378
See application file for complete search history.

(56) References Cited

U.S. PATENT DOCUMENTS

| | | | |
|---|---|---|---|
| 5,264,837 A * | 11/1993 | Buehler | 345/634 |
| 5,486,841 A | 1/1996 | Hara et al. | |
| 5,543,816 A * | 8/1996 | Heacock | 345/8 |
| 5,991,085 A | 11/1999 | Rallison et al. | |
| 6,177,952 B1 | 1/2001 | Tabata et al. | |
| 2004/0238732 A1 | 12/2004 | State et al. | |
| 2006/0250322 A1 * | 11/2006 | Hall et al. | 345/8 |
| 2007/0097513 A1 * | 5/2007 | Amitai | 359/630 |

FOREIGN PATENT DOCUMENTS

| | | |
|---|---|---|
| GB | 2247537 | 3/1992 |
| WO | 95/21395 | 8/1995 |
| WO | WO 2006/013565 | 2/2006 |

* cited by examiner

*Primary Examiner* — Kevin M Nguyen
*Assistant Examiner* — Cory Almeida

(57) ABSTRACT

There is provided a binocular device, including a rigid mechanical body supporting two image sources (2, 4), one for each eye (6, 8) and two lensing devices (12, 14), one for each eye, the lensing devices having a first surface adjacent to the image sources and an opposite, second surface, each of the lensing devices projecting an image (16, 18) of one image source onto an infinite focal plane, and electronic means permitting modification of an image generated to an eye for adjusting the binocular alignment of the images. A method for aligning a binocular device is also provided.

30 Claims, 11 Drawing Sheets

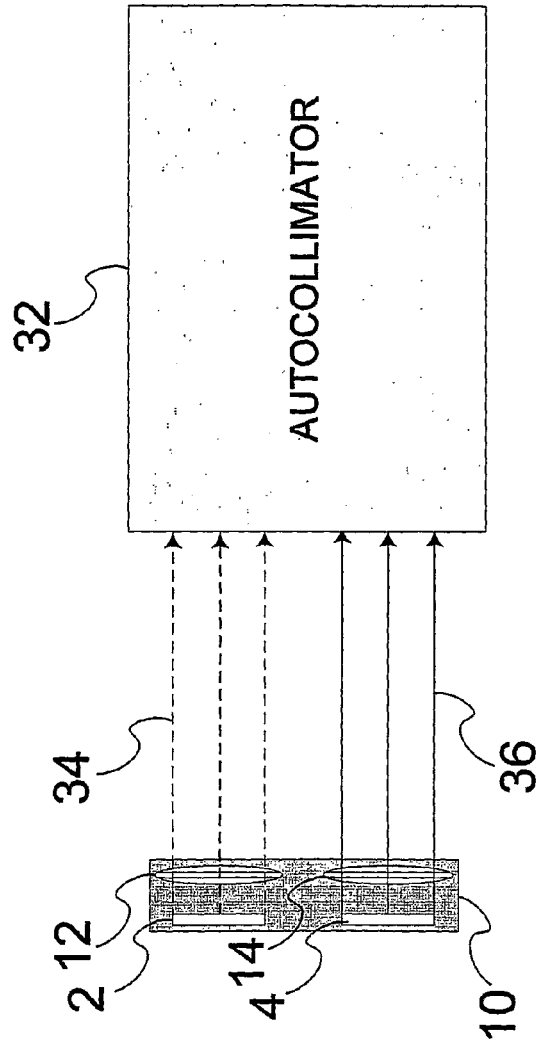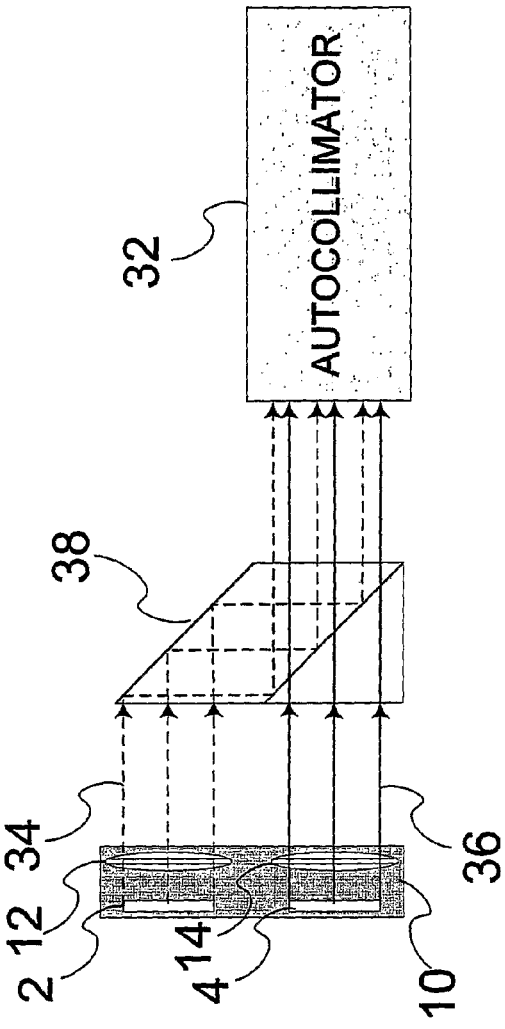

DEVICE AND METHOD FOR ALIGNMENT OF BINOCULAR PERSONAL DISPLAY

FIELD OF THE INVENTION

The present invention relates to binocular optical systems, and in particular, to binocular devices and methods of alignment thereof.

The invention can be implemented to advantage in binocular personal display applications, including two-dimensional and three-dimensional views with or without see-through capabilities. The word "binocular" as used herein refers to an optical device suitable for viewing with two eyes. The more common use of "binocular" as short-hand for "binocular telescope" is referred to herein as "Binoculars".

BACKGROUND OF THE INVENTION

Personal displays are growing in importance with increasing proliferation of mobile and wearable communication, information and entertainment devices, in addition to their more traditional applications for simulators, mixed reality and other head-mounted applications. In many situations a binocular personal display system is preferred to a monocular personal display system for its superior convenience of use over protracted periods. Nevertheless, a binocular personal display requires stringent alignment of the lines-of-sight of the two displayed images. Relatively small misalignment can lead to serious user discomfort, headaches, nausea, and, in extreme cases, symptoms of sea-sickness and other ailments. In general, binocular alignment, requires careful design of the binocular device and often involves alignment procedures. The line-of-sight of the two eyes must be adjusted to lie in the same horizontal plane, bisecting both eyes through their centers, to an accuracy of a few minutes of an arc. Within this horizontal plane the lines-of-sight should be adjusted to cross at the region of the apparent distance of the observed object (this horizontal offset between the lines-of-sight is termed parallax). Both of these angular alignments must be maintained for different inter-pupil distance (IPD) of the user. The IPD of the population typically varies between 54 and 75 mm. A mechanical adjustment for the distance between the pupils is required to ensure a correct IPD, such as is well-known in common Porro Prism Binoculars. Suitable mechanisms for aligning and maintaining the binocular alignment over different IPDs are relatively large and incompatible with personal displays, which are required to be compact.

Many different methods have been devised for binocular alignment, however, so far, some proposed solutions require elaborate alignment methods, while others incorporate mechanical fixtures and alignment mechanisms, which significantly enlarge the personal display devices. The trade-off between the interest to reduce the size and weight of personal displays and the need for accurate binocular alignment is challenging and has resulted in many personal displays that are insufficiently aligned, and others that are inconveniently bulky.

DISCLOSURE OF THE INVENTION

It is an object of the present invention to provide a personal binocular device with high alignment accuracy, while maintaining a compact structure.

It is a further object of the present invention to provide a method of aligning a binocular device first mechanically and then further aligning it electronically.

In accordance with the invention there is therefore provided a binocular device comprising a rigid mechanical body supporting two image sources, one for each eye and two lensing devices, one for each eye, said lensing devices having a first surface adjacent to the image sources and an opposite, second surface, each of said lensing devices projecting an image of one image source onto an infinite focal plane, and electronic means permitting modification of at least one image generated to an eye for adjusting the binocular alignment of said images.

The invention further provides a method for aligning a binocular device comprising a rigid mechanical body supporting two image sources, one for each eye and two lensing devices, one for each eye, said lensing devices having a first surface adjacent to the image sources and an opposite, second surface, each of said lensing devices projecting an image of one image source onto an infinite focal plane, and electronic means permitting modification of at least one image generated to an eye for adjusting the binocular alignment of said images; generating an image pattern on each of the image sources, mechanically aligning at least one of said image sources with the image pattern overlapping each other, and electronically further aligning the overlap between said image patterns.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 illustrates a perspective view of a typical binocular personal display device;

Figure 2:
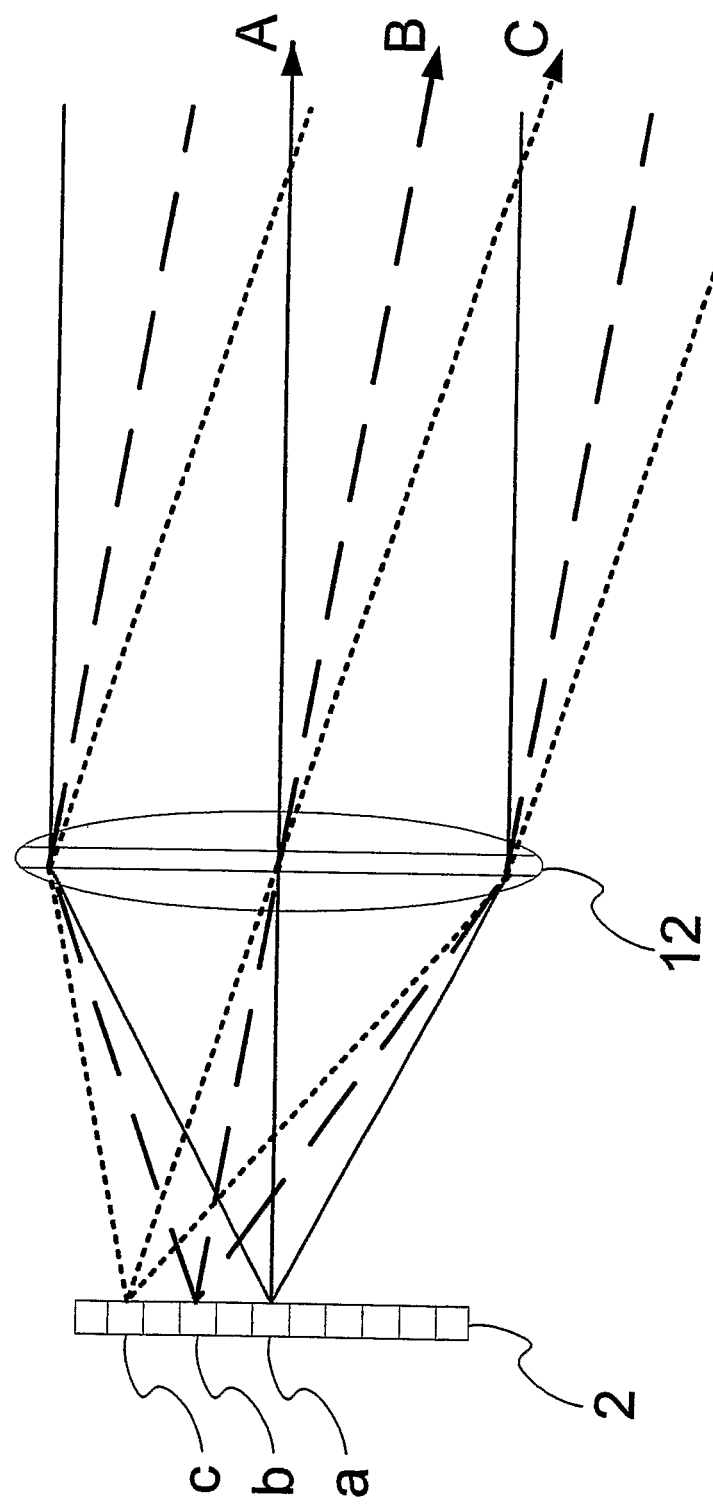
Figure 3:
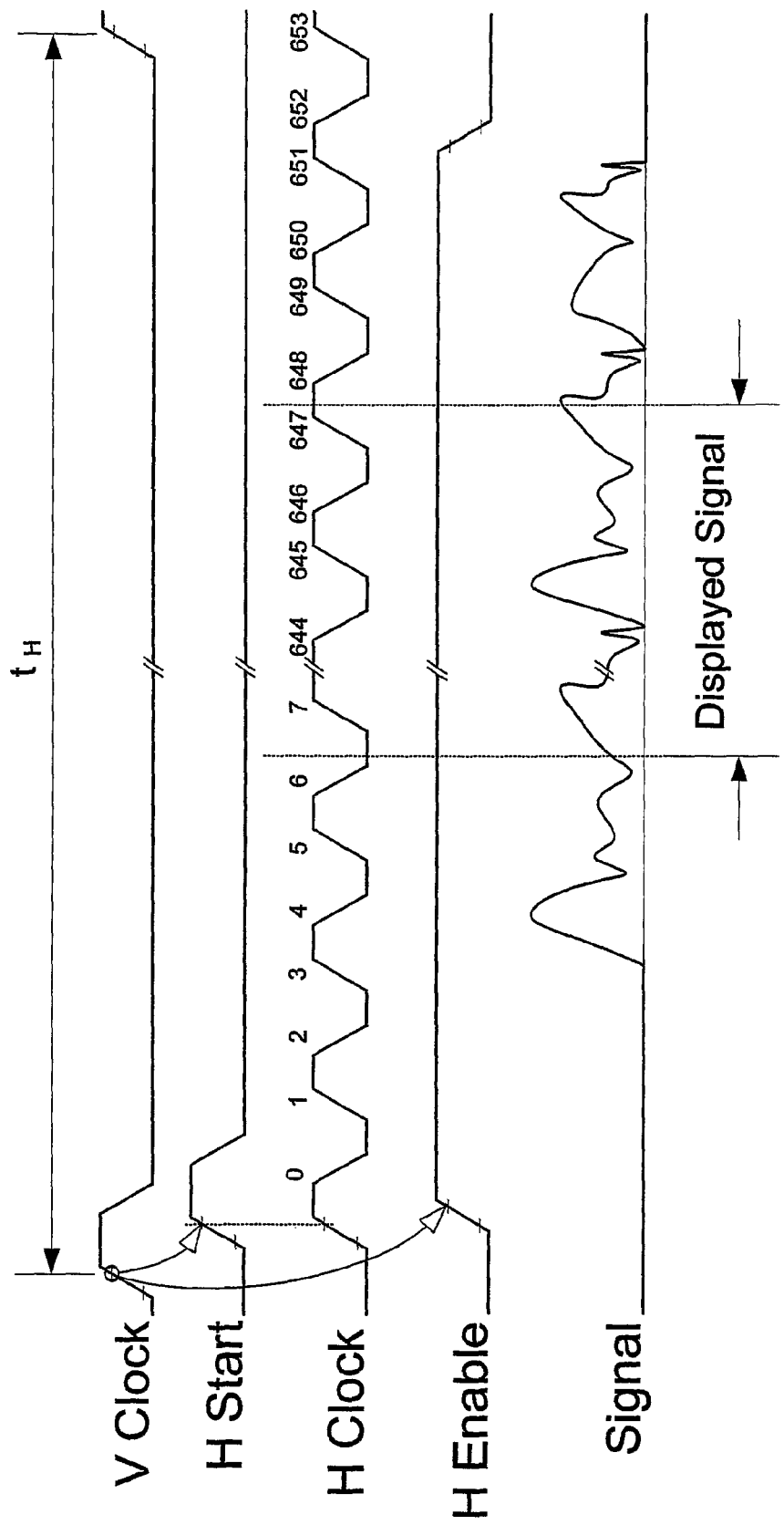
Figure 4:
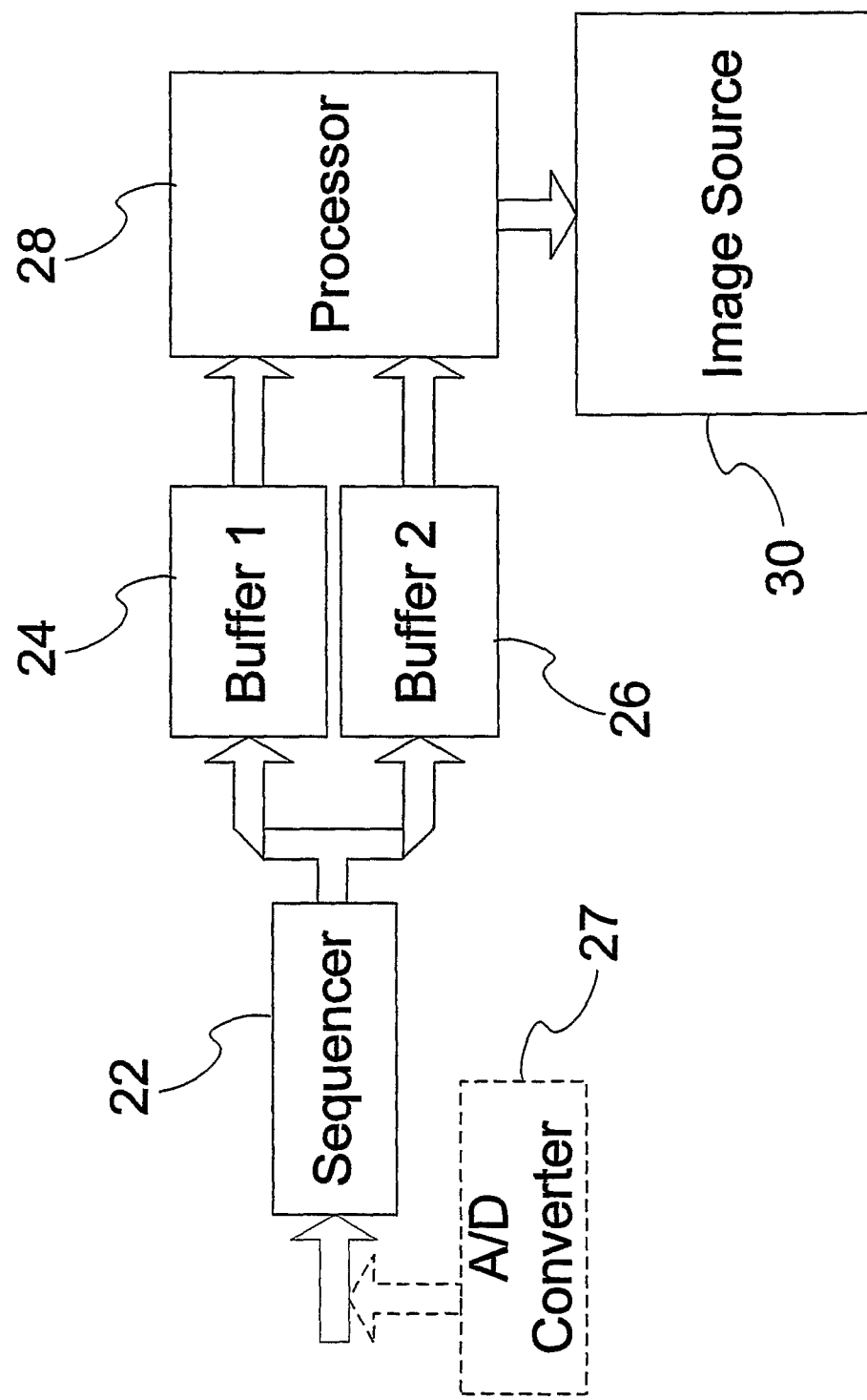
Figure 7A:
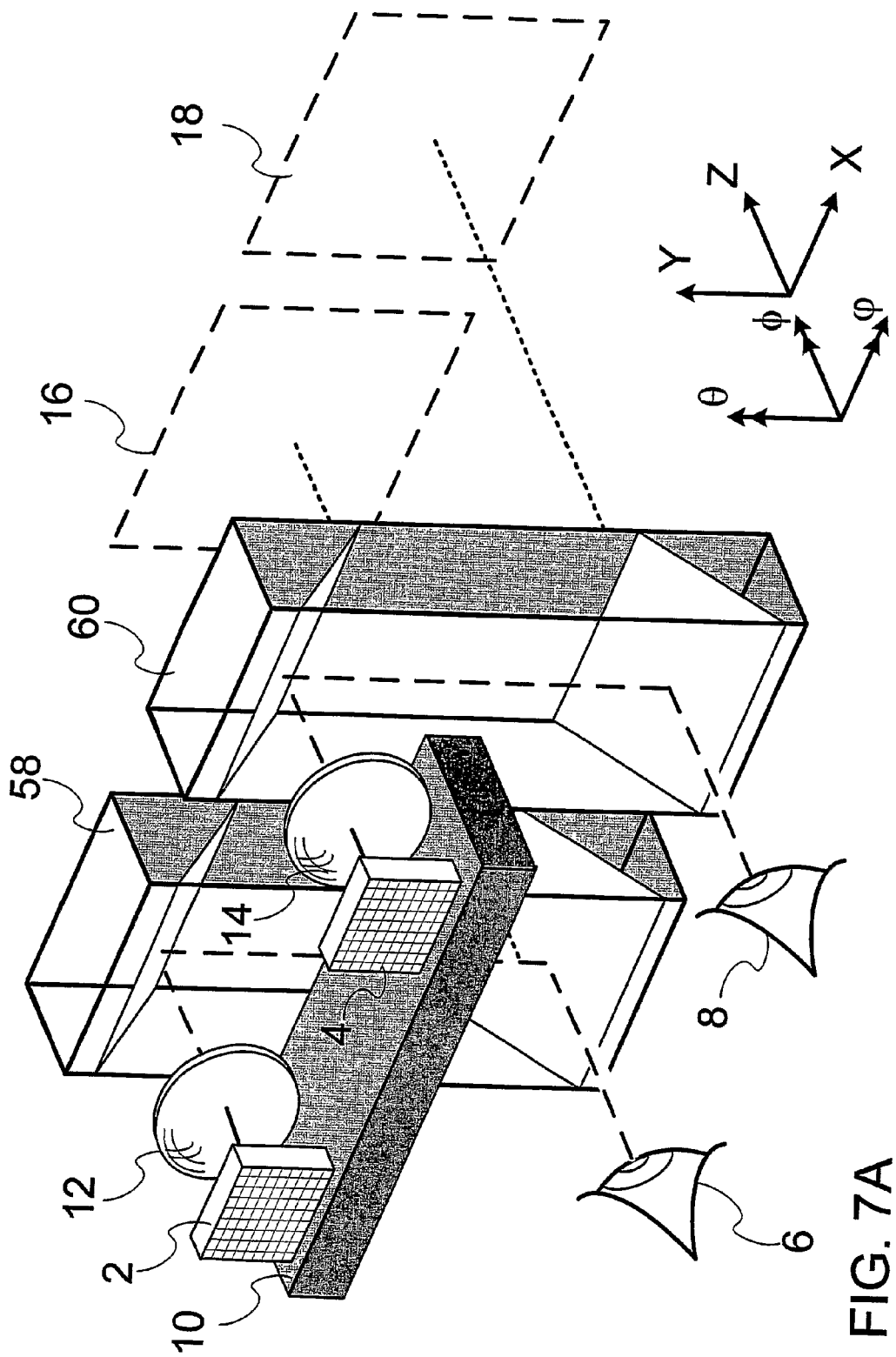
Figure 7B:
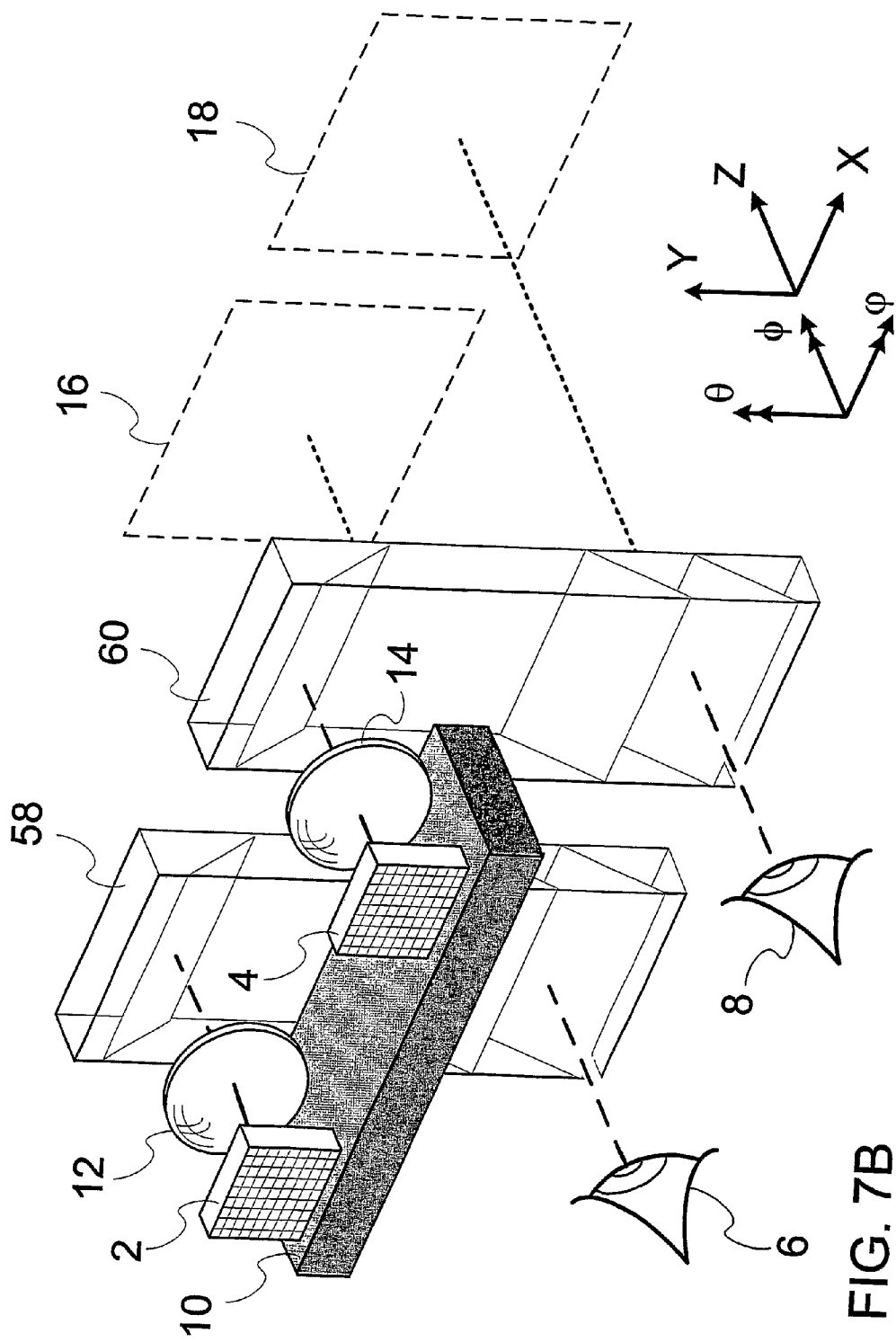
Figure 8:
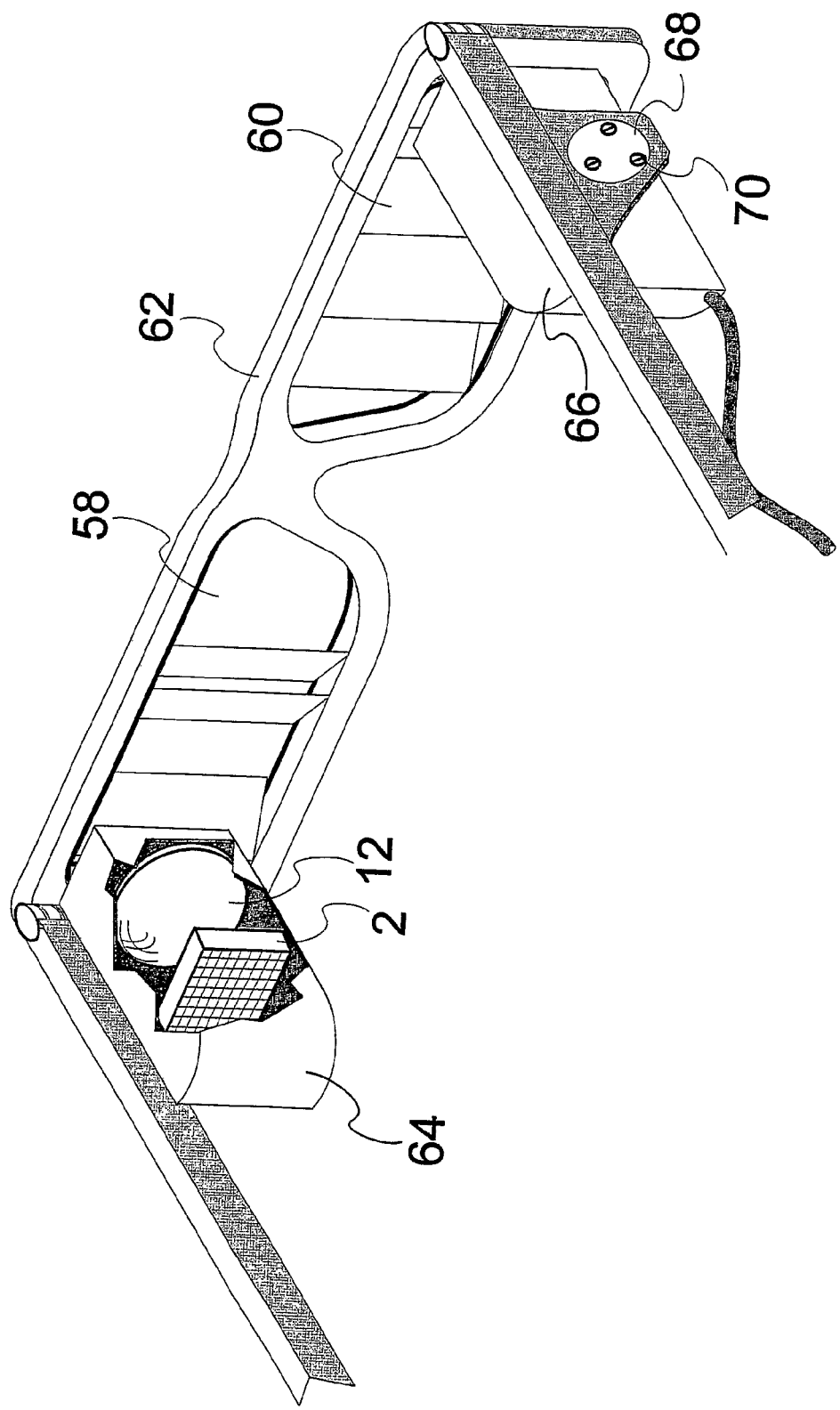
Figure 9:
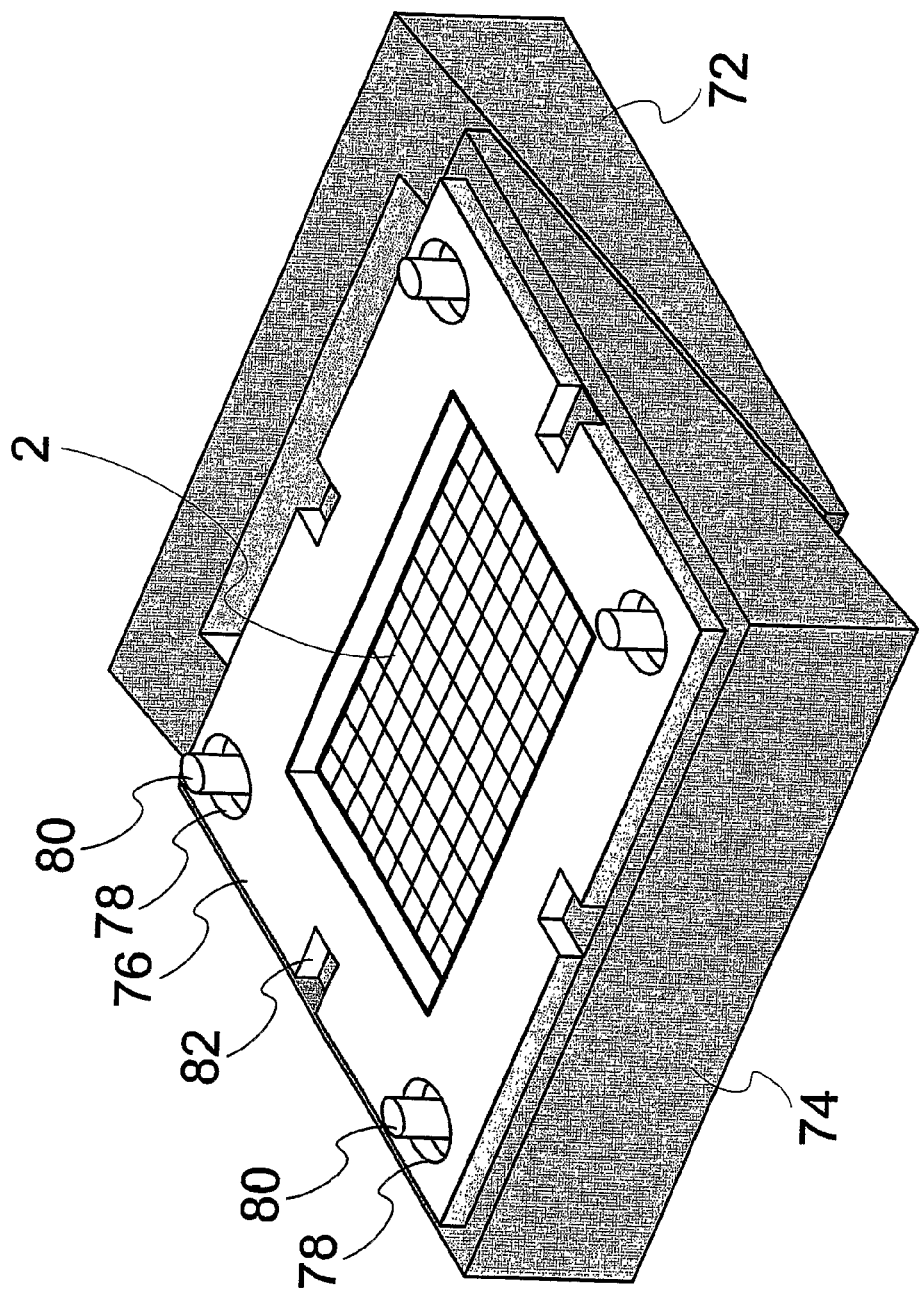

FIG. 2 schematically illustrates a lens transforming image pixels to essential plane waves;

FIG. 3 graphically depicts horizontal clock timing sequences for a pixel-based image source with analog signal inputs;

FIG. 4 is a block diagram illustrating a double-buffer scheme for modifying an image to affect the required alignment control in accordance with the present invention;

FIGS. 5A to 5D schematically illustrate four arrangements for monitoring the alignment of a binocular personal display;

FIGS. 6A to 6C schematically illustrate three arrangements for implementing folding optics for use with an alignment device for binocular alignment of a binocular, according to the present invention;

FIGS. 7A and 7B illustrate perspective views of two embodiments of a binocular device according to the present invention, including combiners;

FIG. 8 is a perspective view of an embodiment of the device according to the present invention in the form of eyeglasses, and FIG. 9 illustrates an embodiment of an image source mount including a focusing mechanism, according to the present invention.

DETAILED DESCRIPTION OF PREFERRED EMBODIMENTS

Figure 1:
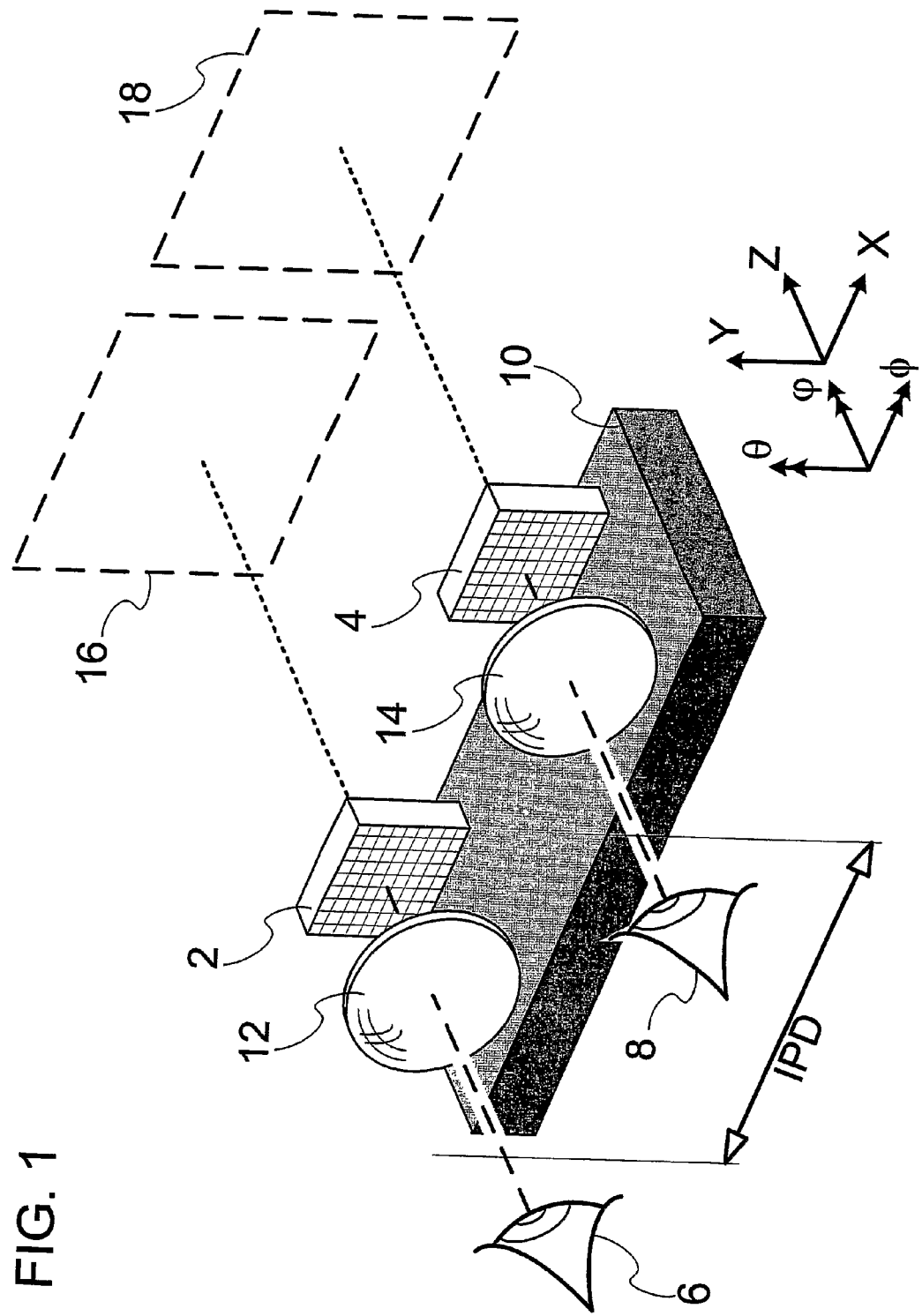

FIG. 1 schematically illustrates a typical binocular personal device, including two image sources 2, 4, one for the left eye 6, and one of the right eye 8 of an observer, mounted on a rigid mechanical body 10. Two magnifying lensing devices 12, 14, are also mounted onto the same mechanical body 10, one for magnifying the left image source 2, and one for magnifying the right image source 4. The lensing devices 12, 14 may be embodied by common lenses, reflection lenses, diffractive optics such as holograms, combinations thereof, or any other image magnifying devices, with or without folding optics for compressing its size. The lensing devices generate two virtual images, 16 and 18 to be viewed, respectively, by the left eye 6 and the right eye 8. The coordinate system, illustrated in the right hand side of the figure, defines the axes as follows: the linear axes Z in the direction of the line-of-sight to the image, and X and Y in the lateral directions. The rotational axes θ, a rotation about the Y-axis, φ a rotation about the Z-axis and φ about the X-axis. The two virtual images 16, 18 should be aligned to the binocular alignment tolerance. This is typically defined as alignment of the two lines-of-sights from each eye to its virtual image to lie in the X-Z plane, and to cross each other in the region of the focal plane of the images. There is also a requirement that the two images be oriented without relative rotation in the X-Y plane. In general, to meet these requirements, the personal display must be adjusted to the IPD of the user, and then determine the lines-of-sight of both eyes, so as to binocularly align them.

The present invention significantly simplifies the binocular alignment process. First, the personal display system is designed to present the images at infinity. At this focal distance, binocular alignment requires that the two lines-of-sight be parallel, a relatively straightforward geometry to define and align to. Furthermore in this configuration all the image components are essentially plane waves and there is no variation of the image as the observer's eyes move across the input aperture of each displayed image. In other words, in contrast to more general arrangements with different focal depths, there is no correction necessary for any deviation of the viewer's eyes from the optical axes of the two images. The present invention therefore offers two significant advantages: the binocular alignment of the proposed device is entirely independent of the location of the eye, and it does not depend on image content. This permits the calibration of the device in the factory and its application with no need for additional parallax corrections.

The further advantage of the present invention resides in a method to facilitate and simplify the binocular alignment itself. For this purpose use is made of the characteristics of a lens imaging to infinity in transforming lateral position on the image source to output angle.

FIG. 2 illustrates a lens 12 with an image source 2 at its focal point generating a virtual image at infinity. It is well known that for this arrangement each pixel of the image source is transformed into essentially a plane wave, each image pixel generating such a plane wave traveling in a different direction. The pixel at the center of the image generates a wave traveling along the optical axis of the lens, pixel 'a' generating a wave A. The further away the pixel is from the center of the image, the larger the angular offset of the resulting wave from the optical axis of the lens; pixels 'b' and 'c' generating waves B and C, respectively. The present invention makes use of this lens characteristic to adjust the direction of the line-of-sight of the image generated as will be described below.

Good binocular performance requires the alignment of the lines-of-sights of the two images to within a few minutes of arc. This is typically a challenging requirement for a mechanical arrangement in a production environment for a device that should be as small and light as possible. Therefore, alignment in two stages is provided. First, the components of the personal display are coarsely aligned using mechanical means, and then the fine adjustment of the line-of-sight of each of the two binocular image sources is aligned to correct for errors in the θ angle by electronically shifting the image across the image source in the X direction. Similarly shifts in the Y direction can be used to adjust errors in the φ direction. There is also a requirement for aligning the two images in φ which can be achieved by appropriately rotating the images in the image sources.

The following numerical example illustrates the significance of the present invention for a practical personal device. Microdisplays are commonly used for personal display applications, which are typically under 25 mm in diagonal. The pixel pitch is typically in the order of 7 to 15 μm. A typical value for the focal length of the imaging lens is 20 mm. Of the different angular tolerances required for binocular alignment of the angular positions in the θ, φ, and φ angles, the most critical is often φ with a typical value of a few minutes of arc, or approximately 1 mrad. An angular tolerance of 1 mrad with a lens of focal length of 20 mm relates to 20:1/1000=20 μm, which indicates that the lateral position tolerance of the image source is 20 μm relative to the optical axis of the lens. Such a positioning tolerance poses a challenge for mechanical alignment in a compact, lightweight mass-produced structure. In contrast, as this tolerance is of the same order of magnitude as the pixel pitch of a typical image source, one could readily move the image by several pixels to center it with respect to the optical axis of the lens. Thus, only a coarse mechanical alignment is required. The final, fine adjustments are performed electronically. Alternatively, should it be possible to manufacture the mechanical components with sufficient tolerance to meet the coarse alignment tolerance, only electronic fine alignment would be necessary.

The present invention is therefore based on a binocular personal device, which is designed to facilitate binocular alignment. The device provides the images at infinity, so that parallel image lines-of-sight are required for good binocular alignment, independent of the eye position in the system and independent of the content of the displayed image. This is a simple requirement that is straightforward to calibrate in production and ensures the personal display remain aligned, irrespective of the relative location of the eye and the optical axis of the image. In practice, this also alleviates the need to adjust for IPD within the allowed eye-motion-box (EMB) of the displayed image. An electronic method of shifting the image in the image source to perform the fine angular alignment required for good binocular alignment is also described. This facilitates and simplifies the design fabrication and calibration of the lightweight, compact personal display suitable for mass production.

Methods to provide the necessary shift of the image on the image source are considered. Some image sources inherently include electronic means for shifting the image in the two lateral dimensions. One example is a CRT image source in which the position of the image within its screen is controlled by shifting the initial position of the scanning electron beam. Such image sources can be used for the purpose of the present invention. The implementation of such image shifts in image sources, which do not provide this capability built-in, is described hereinafter. For convenience sake, the discussion will be limited to a pixel-based microdisplay, such as a transmissive LCD, reflective LCoS, or self-emitting OLED devices, but it is equally applicable to other image sources including scanning devices such as MEMs, DLP, or even CRT devices.

A method proposed to shift the image laterally is explained with the aid of the horizontal timing clock sequence of a pixel-based microdisplay with analog input signals shown in FIG. 3. The sequence describes a horizontal clock (H CLOCK), which is used to sample the analog signal scanning across one horizontal image line. The sampled data is entered sequentially into the line of pixels of the image source, so as to display the image line. The sequence of each line is initiated with a horizontal start (H START) signal, itself synchronized to the "new line" signal (V CLOCK). There are more clock signals per line than pixels in the image source. In this example, the image source holds 640 pixels but its control shows 653 clocks. It is therefore quite possible to shift the beginning of the image line by either suppressing the clocks to begin with a delay of a few clock periods or adding clock pulses to precede the first clock. This can be accomplished by adding pipeline delays to delay the analog signal and similarly delay the clock stream. For example, for a clock frequency of 20 MHz, an analog delay of 200 ns and no pipeline delay on the clock stream shifts the image 4 pixels to, say, the left. A 200 ns analog delay and a 4-clock delay to the clock stream generates an unshifted image line, and, of course, a clock shift of a larger number of clocks, shifts the image to the right. The same time shift as applied to the analog signal is also required for the vertical clocks.

A similar pipeline arrangement is also applicable to shift the image vertically by shifting the vertical clock. Adding clocks to precede the first clock will cause skipping of the same number of display lines at, say, the top of the image. This will shift the image downwards. Similarly, delaying the first vertical clock by a number of clocks will load data from a lower line to the top line of the image and effectively shift the image upwards. In both the horizontal and the vertical shifts it may be advantageous to electronically force a "zero signal" to generate "dark pixels", to ensure that the unfilled pixels appear as part of the image frame.

An alternative method for modifying the displayed image for the purpose of fine-tuning the binocular alignment, is shown in FIG. 4. The display signal is fed by a sequencer 22, alternately to two buffers: odd signal image frames to buffer 24, and even signal image frames to buffer 26. In analog display signal streams, it is necessary to first convert the data to digital form, which is effected by an A/D converter 27. While one buffer is filled up, the other buffer is read by a suitable processor 28 performing modifying operations on the stored image frame, so as to controllably affect the projection of the image lines-of-sight angles of each image. The modified image data is then fed to the image source 30 to display a modified image as necessary to affect the fine adjustment of the binocular alignment. In analog display signal streams it is necessary to convert the data back into the required analog form. This implementation is more flexible than shifting the image clocks as proposed above, and permits programming to a variety of image modifying operations, including lateral image shift or image rotation. It may be advantageous to generate "dark pixels" in display regions that are "vacated" to ensure that the unfilled pixels appear as part of the image frame. Additionally, it is foreseen that for certain applications, the shift of the image may be required with sub-pixel resolution, to which suitable algorithms are available.

Figure 5C:
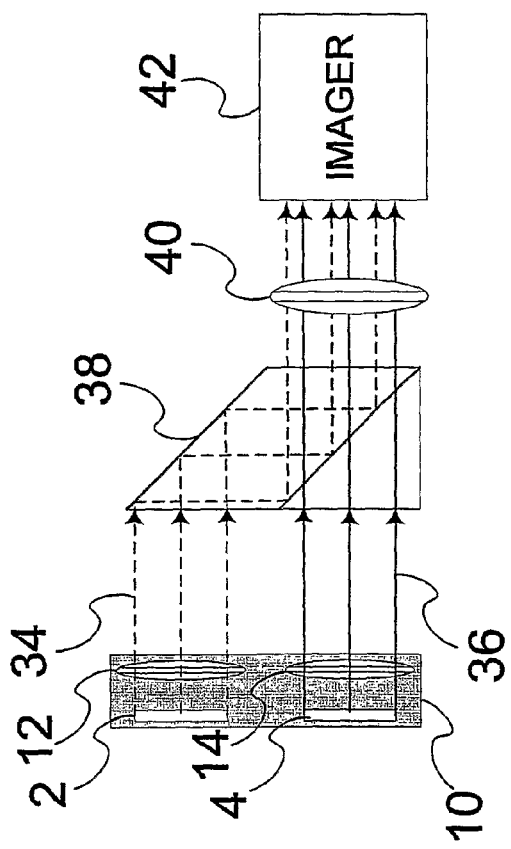

The present invention also provides means for monitoring the binocular alignment of the personal display, thereby facilitating adjustment and calibration. FIGS. 5A to 5D schematically illustrate four arrangements for monitoring the alignment of a binocular personal display: a) using a large aperture autocollimator; b) using an autocollimator and folding optics; c) using folding optics, a magnifying lens and an imaging device, and d) using folding optics and both an autocollimator and a magnifying imaging device simultaneously. FIG. 5A illustrates a sufficiently large operative autocollimator 32 which can accommodate the input image beams 34, 36 from both sources simultaneously. Suitable input image patterns are used in each of the image sources. Here it is appropriate to illuminate only the central pixel, or small number of pixels central to the image of each image source, so as to generate essentially a single plane wave in the direction of the line-of-sight of the virtual image. As the images are focused at infinity, they each generate fine vertical and horizontal lines in the autocollimator; misalignment in the θ angle appears as a separation between the vertical fine lines associated with each image, whereas misalignment in the φ angle appears as a separation between the horizontal fine lines associated with each image, as seen the autocollimator. The image sources, or at least one of the image sources, should be adjusted to eliminate the separation of the autocollimator fine lines generated by the left image and the right image, at which point the personal display is calibrated. Adjustment can be performed both mechanically by moving components for coarse adjustment, and electronically, by modifying the images of either image source for fine adjustment.

Alternatively, referring to FIG. 5B a small aperture autocollimator can be used for the same purpose. This requires, in addition, a suitable optical folding device 38. The optical folding device 38 should be constructed to ensure that the input angles of both image beams, 34, 36 are reproduced with high accuracy at the output of the optical folding device 38. This is advantageously achievable with a parallel-sided rhombic prism or other optics. The main requirement is an accurate parallelism of the rhombus, ensuring that small tilts and displacements of the rhombic prism relative to the optical system being tested, are not significant. Suitable input image patterns are used in each of the image sources. Here it is also appropriate to illuminate the central pixel, or small number of pixels central to the image of each image source, so as to generate essentially a single plane wave in the direction of the line-of-sight of the virtual image. The operation of the autocollimator itself, with two fine crossed lines generated by each image, is similar to the description above for the large aperture autocollimator option.

Alternatively, an alignment using an imaging device is shown in FIG. 5C. Here folding optics are used to bring the images from either beam 34, 36 into an aperture of a magnifying lens 40. A folding optics device 38, which ensures accurate reproduction of the angles of the inputs and the output beams, is introduced to reduce the spread of the two images. The two images are then projected to an imager 42, e.g., a sensor or a CCD camera, for viewing, or to be simply viewed by an eye. The image from the imager 42 can be displayed on a monitor (not shown), or input into a computer (not shown), for automated analysis. Suitable image patterns are used in each of the image sources. Here it is appropriate to generate some form of a grid or a frame pattern that can be used to align the images relative to each other. When these images overlap, the personal display is binocularly aligned. Alternatively, it is advantageous to apply a deliberate safety misalignment in the θ angle inwards, so that the lines-of-sight of the two images cross. The slight "cross-eye" condition is convenient to the user and is preferred to an "outward parallax" condition, which cannot be tolerated. Adjustment is advantageously performed both mechanically, for coarse adjustment, and electronically for fine adjustment, by modifying the images of either image source. Still alternatively, in pixel-based image sources, it is possible to use the grid pattern of the image source itself as a pattern suitable for binocular alignment in the imager 42.

Figure 5D:
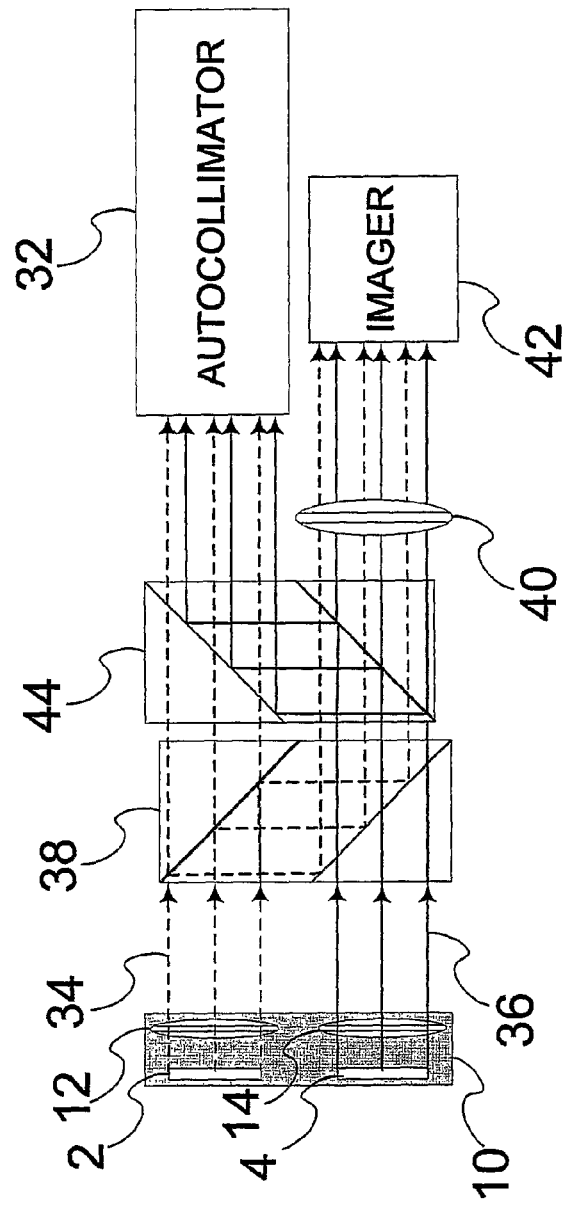

Turning now to FIG. 5D, an alignment using both an imager 42 and an autocollimator 32 simultaneously, is illustrated. Here, two folding optics devices 38, 44 are used to bring the images from either beams 34, 36, into either device 38, 44, each operating as described above. Suitable patterns required for each alignment device, can be generated separately for implementing the alignment with each device. The advantage of using both the imager 42 and the autocollimator 32 is the ability to conveniently align all the necessary binocular parameters in one setup. The autocollimator 32 is sensitive to misalignment in the θ and φ angles, but cannot monitor any rotational misalignment in φ between the two image sources. The imager 42 is capable of monitoring alignment errors in φ, but is relatively less sensitive to misalignment in θ and φ as compared to the autocollimator.

Additionally, and alternatively, any of the embodiments shown in FIGS. 5A through 5D can be automated. In arrangements deploying an autocollimator 32 (FIGS. 5A, 5B and 5D), a camera (not shown) is added to pick up the patterns detected by the autocollimator 32 and feed those into a processor for display and analysis. Similarly, the image from the imager 42 (FIGS. 5C and 5D) is input into a processor for display and analysis. The processor (not shown) is programmed to also generate the required patterns onto the images sources of the personal display device under calibration. The processor further controls the electronic image modifications for fine adjustments, and any automated mechanical controls provided. The processor can be operative to perform completely automated binocular alignment procedures.

Figure 6:
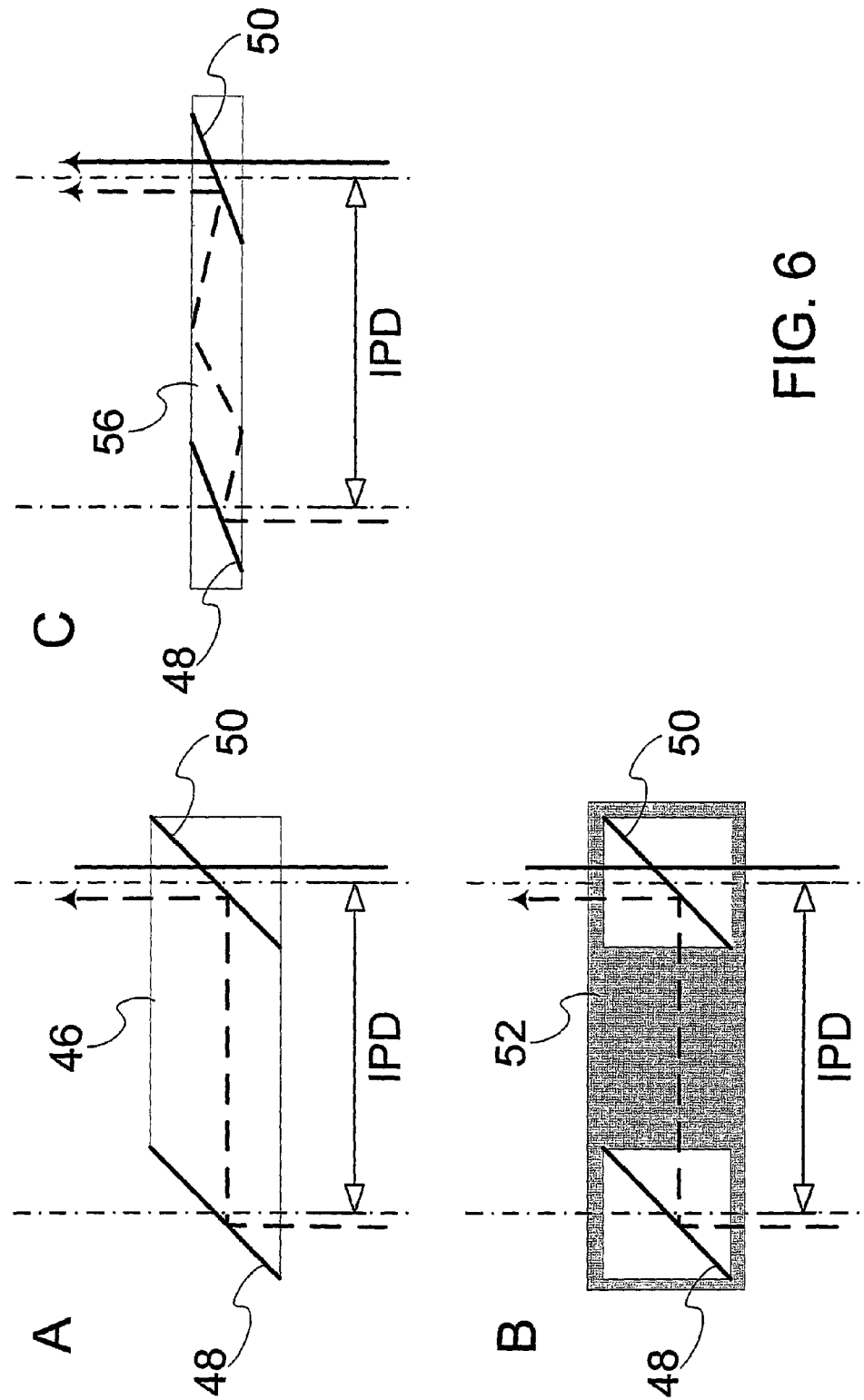

FIG. 6 illustrates three embodiments for the folding optics suitable for the use in the binocular alignment apparatus. FIG. 6A shows a rhombic prism 46 arrangement. Here, the image intended for the left eye 6 is reflected off reflector 48 and then off a semi-transparent reflector 50, and the image intended for the right eye 8, is transmitted straight through the semi-transparent reflector 50. The propagation directions of the image intended for the left eye 6 at the input to the prism 46 and the output from the prism are identical to a tolerance closely resembling the tolerance of error in parallelism between the reflector 48 and semi-transparent reflector 50. Furthermore, the output propagation direction remains parallel to the input propagation direction to the same tight tolerance irrespective of any angular or linear misalignment of the prism. Thereby, the images for the left and for the right eye can be monitored on a relatively small aperture of a detecting device, whether it is an imager 42, such as a camera (as in FIG. 5C), an autocollimator 32 (as in FIG. 5B), or another device.

The size and cost of a rhombic prism for typical IPD values (around 64 mm) and having sufficiently large apertures can be large. An alternative implementation that can reduce the manufacturing cost of the folding optics is shown schematically in FIG. 6B. Here, two standard off-the-shelf reflecting components 48, 50 are mounted on a suitable rigid frame 52. The reflecting component 48 can be implemented with a beam splitter, a mirror, or a reflecting prism. The semi-transparent reflecting component 50 is implemented with a beam splitter. Both of these components are mechanically mounted onto a rigid frame 52 and aligned to ensure that the reflector and semi-transparent reflector are parallel to each other to a tight tolerance. The arrangement of FIG. 6B operates in the same manner as described above for the arrangement of FIG. 6A.

An alternative embodiment with a more compact size is shown in FIG. 6C. Here, an LOE 56 (light guide optical element) serves to fold the image of the left eye 6 onto the image of the right eye 8. The semi-transparent reflector 50 and reflector 48 are fabricated parallel to each other, so as to ensure that the output propagation direction is identical to the direction of the input to a tight tolerance. This arrangement is more compact in that it takes advantage of total internal reflection in the light-guide to fold the images propagating between the reflector 48 and semi-transparent reflector 50. In other respects, the arrangement of Fig. C operates in the same manner as described above, for the arrangement in FIG. 6A.

Each of the arrangements in FIGS. 6A, 6B and 6C can be designed to advantage by ensuring that the intensity of the two images in the eyes 6 and 8 are nearly equal. This is accomplished by equating the transmissivity of the semi-transparent reflector 50 to the product of reflectivities of reflector 48 and the semi-transparent reflector 50, such that $T_{50} \approx R_{48} \times R_{50}$.

FIG. 7A illustrates a typical binocular personal display arrangement with, in addition to the rigid mechanical body 10, image sources 2 and 4 and lensing devices 12, 14, also two combiners 58, 60. Such combiners are commonly added for see-through applications, for modifying the geometrical configurations of the personal display or for compactness consideration in non-see-through personal displays. Although the addition of a combiner substantially modifies the mechanical and optical characteristics of the personal display, in terms of the binocular alignment process they are treated in the same manner. Here too the images 16, 18 are located at infinity, and for good binocular alignment the lines-of-sight of the images should be aligned parallel to each other. Coarse alignment is performed mechanically; fine alignment is performed electronically by suitably modifying the images of each image source as described above. Similar electronic means as described above for modifying the images are used.

Of particular interest to the personal binocular device with combiners 58, 60 is the implementation of LOE-based combiners, as illustrated in FIG. 7B. Advantages of deploying this structure are as follows:

a. The overall size of an LOE-based binocular personal display is significantly smaller than any other implementation for a given field-of-view (FoV);

b. The LOE facilitates large eye-motion box (EMB) values without increase in overall system volume. This is of particular interest for a binocular personal display as, according to the present invention, the binocular alignment of the personal display is insensitive to eye movements within the EMB. The EMB can be made sufficiently large to cover a relatively large IPD range, alleviating the need for IPD adjustments. Practically, either a single IPD is designed to cover the entire variation of the population, or a small number of IPD sizes is devised to cover large ranges of the populations, e.g., designing a Small, Medium and Large setting;

c. An LOE-based binocular personal display can be configured in the "top down" configuration, as shown in FIGS. 6A to 6C, which is more suitable for incorporating into head-gear, or in a "side" configuration (see FIG. 8), more suitable for incorporation into a standard eyeglasses format, and d. Other advantages of an LOE-based personal display, include the inherent see-through capability, the unprecedented compactness of the combiner in front of the eye, the ability to expand the pupil of the lensing optics allowing the use of small lensing optics and image sources even for a large FoV device and high performance of the combiner itself.

FIG. 8 illustrates an embodiment of the present invention in the form of a wearable fixture, e.g., eyeglasses. A rigid frame 62 holds two LOE combiners 58, 60. Two image delivery pods 64, 66 are also mounted onto the same frame, one pod 64 for delivery of an image to the left eye and the second pod 66 for delivery of an image to the right eye. Each pod is secured with a spherical mount 68 that, when fixing screws 70 are released, allows mechanical angular tilting of each pod. Once in the correct orientation, the pods are secured in place by tightening the screws 70 in that position. This mechanism serves for affecting coarse adjustment for binocular alignment of the device. Here the two pods are angularly tilted in three axes θ, φ and φ to reach the correct alignment position with respect to each other. This implementation takes advantage of the following features of the device:

a. The direction of propagation of the images is essentially independent of the linear positions of the pods, i.e., the images are at infinity and the resulting image components are essentially plane waves, which are not sensitive to lateral (in the X, Y axes) or axial motion (in the Z-axis);

b. The location of the LOE combiners 58, 60 do not affect the binocular alignment between the pods. As the image is at infinity, linear motion of the LOE does not influence the images. Furthermore, as the reflectors of the LOE combiners are parallel to a tight tolerance, angular misalignment of either LOE combiners does not affect the binocular alignment of the overall device. Hence only the pods need to be aligned relative to each other, and c. Since the device is designed to be imaged to infinity, it remains aligned independent of the content displayed and independent of the location of the eye for as long as the eyes are located within the EMB. The LOE combiners can be designed to support a very large EMB, so the same device can fit a large range of IPDs.

Instead of using a mechanically adjustable fixture for tilting the pods to coarse adjustment of the binocular alignment, it is possible to mount the pods loosely onto the frame. In this solution, the pods are free to tilt into the desired coarse alignment using external manipulators, and once in position, the pods are cemented in place.

An alternative to performing the coarse adjustment of the binocular alignment mechanically by tilting the pods 58, 60 one relative to the other, is to fix the pods 58, 60 to frame 62 and mechanically move the image sources 2, 4 in the lateral directions. A mechanical mount suitable for such an implementation is shown schematically in FIG. 9. The mount includes a base formed by a two-part wedge-shaped elements 72, 74 and a lateral sliding plate 76. The two wedge-shaped elements 72, 74 serve to adjust the axial separation between the image sources 2, 4 and the lensing devices 12, 14 (not shown), while maintaining the image sources 2, 4 perpendicular to the optical axis of the lensing devices 12, 14, respectively. The image sources 2, 4 are mounted onto the lateral sliding plate 76. The lateral sliding plate 76 is mounted in an accurate axial position when placed against the top surface of the elements 72, 74. The sliding plates 76, however, are free to translate laterally by means of locating grooves 78 which are larger than the locating pins 80. Once the focal distance of the image source is set through adjustment of the relative positions of the wedge-shaped elements 72, 74, lateral manipulators (not shown) grip the sliding plate 76 in its gripping grooves 82 and adjusts its lateral position with respect to the lensing elements. The sliding plate 76 is then affixed, e.g., cemented into position, so as to set the correct binocular alignment of the overall device.

A further optional feature of the embodiments of the present invention is the incorporation of ophthalmic corrective lenses. A main attribute of the present invention is the focus at infinity. In order to accommodate myopic users, it is necessary to allow correction of the user's vision for comfortable viewing of images at infinity. In the "top down" configurations shown schematically in FIGS. 7A and 7B, this is solved by mounting the personal display device over any user-worn ophthalmic eyeglasses. In the eyeglasses embodiment shown in FIG. 9, however, it is preferable to incorporate such ophthalmic correction within the same device. This can be accomplished by mounting suitable ophthalmic corrective lenses onto the same frame, between the viewer's eyes and the LOE-combiners. These can be mounted onto the same frame, on a separate clip-on frame mounted internally, or onto the LOE's themselves. A further modification for the convenience of the user relates to means for reducing the external brightness when using the device in a see-through mode. Here it is possible to mount a partially transmitting filter in front of the LOEs (between the LOE and the virtual image) or paint the front surface of the LOE, or add an active filter with photo-chromic, or electronic control of the transmissivity.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A binocular device, comprising:
   a rigid mechanical body supporting two image sources, one for each eye and two lensing devices, one for each eye, the lensing devices having a first surface adjacent to the image sources and an opposite, second surface, each lensing device projecting image frames from one image source onto an infinite focal plane;
   electronic means permitting modification of at least one image composed of display lines generated to an eye for adjusting the binocular alignment of the image frames by electronically forcing pixels in part of the display lines with zero signal to be generated as dark pixels; and
   two LOE-based combiners, each combiner disposed adjacent to the second surface of a lensing device, each combiner having a first portion axially aligned with the direction of line of sight of the lensing devices and a second portion axially laterally displacing the projected image on the first portion into an eye position.

2. The binocular device of claim 1, wherein said electronic means for modifying an image comprises a clock-stream delay line capable of shifting pixels of the image in two dimensions to a programmed value.

3. The binocular device of claim 1, wherein said electronic means for modifying an image comprises a double buffer feeding a processor.

4. The binocular device of claim 1, wherein the image sources provide control over lateral shifts of the image.

5. The binocular device of claim 1, wherein said electronic means for modifying an image is capable of generating dark pixels where a modified image is inactive.

6. The binocular device of claim 1, wherein said two LOE-based combiners are operative to cover a range of IPD values.

7. The binocular device as claimed in claim 1, wherein said body comprises mechanical means for loosely holding alignment components in the device to be cemented in place after binocular alignment.

8. The binocular device as claimed in claim 7, wherein said mechanical means comprises, a loosely mounted image source holder permitting lateral positioning, fixable in position after alignment.

9. The binocular device as claimed in claim 7, wherein said mechanical means comprises fixable spherical mounts.

10. The binocular device as claimed in claim 1, wherein said body comprises sufficiently accurate mechanical means for binocular alignment to within the coarse tolerance, such that only electronic alignment is required to achieve fine binocular alignment.

11. The binocular device as claimed in claim 1, further comprising an eyeglasses frame, wherein each of said image source and lensing devices is affixed to portions of the frame.

12. The binocular device as claimed in claim 11, wherein each of said image source and lensing optics is mounted in two independent enclosures and wherein binocular alignment is affected by tilting at least one of said independent enclosures.

13. The binocular device as claimed in claim 1, further comprising a wearable fixture, wherein each of said lensing devices and image sources are mounted onto each combines, and a coarse alignment means is provided to tilt the combiner-lensing-source assembly.

14. The binocular device as claimed in claim 13, wherein the wearable fixture is an eyeglasses frame.

15. The binocular device as claimed in claim 1, further comprising a wearable fixture, wherein each of said sensing devices is mounted onto each combiner, and coarse alignment means is provided to move the at least one of the image sources.

16. An alignment monitoring apparatus for a binocular device of claim 1, comprising an optical folding device for diverting at least one image into an autocollimator.

17. An alignment monitoring apparatus as claimed in claim 16, wherein said optical folding device is an LOE.

18. An alignment monitoring apparatus as claimed in claim 16, comprising an autocollimator for collecting light beams from both of the binocular image sources.

19. The alignment monitoring apparatus as claimed in claim 18, further comprising a camera for receiving light beams from the autocollimator and transforming the beams into signals to be fed to a processor.

20. The alignment monitoring apparatus as claimed in claim 16, wherein said electronic means is monitored by a processor capable of controlling the alignment of the line-of-site of each image.

21. The alignment monitoring apparatus as claimed in claim 16, wherein the image pattern of each image source is the pixel structure of the image source.

22. The binocular device as claimed in claim 1, wherein said lensing devices are magnifying lenses.

23. The binocular device as claimed in claim 1, wherein said body comprises mechanical means for coarse alignment.

24. A method for aligning a binocular device according to claim 1, comprising:
generating an image pattern on each of the image sources;
mechanically aligning at least one of said image sources with the image pattern overlapping each other, and
electronically further aligning the overlap between said image patterns.

25. The method as claimed in claim 24, wherein said lensing devices are magnifying lenses and the method further comprising the step of magnifying the image patterns before alignment.

26. The method as claimed in claim 24, wherein said electronic alignment is effected by modifying at least one of said image patterns in at least one dimension for achieving a precise overlap between image pixels of the two images.

27. The binocular device of claim 1, wherein the display lines forced with zero signal are formed in both the horizontal and vertical directions.

28. The binocular device of claim 1, wherein the display lines forced with zero signal appear as part of an image frame.

29. The binocular device if claim 1, wherein the electronic means permits programming to a variety of image modifying operations, including lateral image shift and image rotation.

30. A binocular device, comprising:
a rigid mechanical body supporting two image sources, one for each eye and two lensing devices, one for each eye,
the lensing devices having a first surface adjacent to the image sources and an opposite, second surface, each lensing device projecting an image frame from one image source onto an infinite focal plane;
electronic means permitting modification of at least one image composed of display lines generated to an eye for adjusting the binocular alignment of the image frames by electronically forcing pixels in part of the display lines with zero signal to generate one or more regions vacated of pixels; and
two LOE-based combiners, wherein each combiner disposed adjacent to the second surface of a lensing device, and wherein each combiner having a first portion axially aligned with the direction of the line-of-sight of the lensing devices and a second portion axially laterally displacing the projected image on the first portion into an eye position.

* * * * *